US008177159B2

(12) United States Patent
Khakimov et al.

(10) Patent No.: US 8,177,159 B2
(45) Date of Patent: May 15, 2012

(54) EMERGENCY AND RESCUE AIRCRAFT

(76) Inventors: Boris V. Khakimov, Moscow (RU);
Alexandr N. Chernikov, Moscow (RU);
German V. Demidov, Kazan (RU);
Rustem Z. Khamitov, Moscow (RU)

( * ) Notice: Subject to any disclaimer, the term of this patent is extended or adjusted under 35 U.S.C. 154(b) by 226 days.

(21) Appl. No.: 12/507,592

(22) Filed: Jul. 22, 2009

(65) Prior Publication Data
US 2010/0096493 A1    Apr. 22, 2010

Related U.S. Application Data

(63) Continuation of application No. PCT/RU2008/000068, filed on Feb. 5, 2008.

(30) Foreign Application Priority Data

Feb. 5, 2007    (RU) ................................ 2007104241

(51) Int. Cl.
*B64B 1/20*    (2006.01)
*B64B 1/26*    (2006.01)

(52) U.S. Cl. ................... 244/5; 244/30; 244/56

(58) Field of Classification Search ................ 244/5, 25, 244/29, 30
See application file for complete search history.

(56) References Cited

U.S. PATENT DOCUMENTS

| 1,726,062 | A | * | 8/1929 | Gilman | ........................... 244/48 |
|---|---|---|---|---|---|
| 3,801,044 | A | * | 4/1974 | Moore | ............................. 244/5 |
| 4,165,810 | A | * | 8/1979 | Young | ........................... 414/595 |
| 4,699,337 | A | * | 10/1987 | Lewis | ........................ 244/137.1 |
| 5,026,003 | A | | 6/1991 | Smith | |
| 5,240,206 | A | * | 8/1993 | Omiya | ............................. 244/25 |
| 5,348,251 | A | * | 9/1994 | Ferguson | ......................... 244/30 |
| 5,595,358 | A | | 1/1997 | Demidov et al. | |
| 5,823,468 | A | * | 10/1998 | Bothe | ............................... 244/2 |
| 5,909,857 | A | | 6/1999 | Filimonov | |
| 6,196,498 | B1 | * | 3/2001 | Eichstedt et al. | .................. 244/5 |
| 6,293,493 | B1 | * | 9/2001 | Eichstedt et al. | ............... 244/30 |
| 6,315,242 | B1 | * | 11/2001 | Eichstedt et al. | ............... 244/30 |
| 6,880,783 | B2 | * | 4/2005 | Munk | ............................ 244/25 |
| 7,040,572 | B2 | * | 5/2006 | Munk | ........................ 244/100 R |

FOREIGN PATENT DOCUMENTS

| EP | 0861773 | A1 | 9/1998 |
|---|---|---|---|
| GB | 315107 | A | 7/1929 |
| RU | 2009073 | C1 | 3/1994 |
| RU | 2092381 | C1 | 10/1997 |
| RU | 2093414 | C1 | 10/1997 |

OTHER PUBLICATIONS

International Search Report, mailed Jun. 19, 2008, from International Application No. PCT/RU2008/000068, filed on Feb. 5, 2008.
English translation of International Preliminary Report on Patentability, dated Sep. 8, 2009, from International Application No. PCT/RU2008/000068, filed on Feb. 5, 2008.

* cited by examiner

*Primary Examiner* — Timothy D Collins
*Assistant Examiner* — Joseph W Sanderson
(74) *Attorney, Agent, or Firm* — Houston Eliseeva, LLP

(57) ABSTRACT

A rescue aircraft having a rigid body with gas-filled envelopes and propulsion devices located inside rotatable aerodynamic toroidal modules. A longitudinal through passage in the lower part of the aircraft connects a crew cabin, a cargo-and-passenger compartment, fuel tanks, and accessories. The aircraft has exit hatches, mooring devices, and a gangway with railings and a removable cart. The aircraft also has a cross passage with exits onto its wings and a vertical passage with a pulley and other devices for lowering and lifting people and cargo. The lower part of the aircraft and hollow wings are filled with a foamed plastic for buoyancy and strength.

9 Claims, 4 Drawing Sheets

EMERGENCY AND RESCUE AIRCRAFT

RELATED APPLICATIONS

This application is a Continuation of International Application No. PCT/RU2008/000068, filed on Feb. 5, 2008, which claims priority to Russian Patent Application No. 2007104241, filed on Feb. 5, 2007, both of which are incorporated herein by reference in their entirety.

FIELD OF THE INVENTION

The invention concerns area of aeronautical engineering, namely to designs of the multipurpose combined aircrafts. This invention can be used as emergency evacuation equipment for people from high-rise buildings, saving equipment of people in mountains, on water, equipment for liquidation of failures and fire extinguishing, equipment for monitoring of highways and territories, as an assembly and cargo-passenger transport vehicle.

BACKGROUND OF THE INVENTION

The multipurpose combined aircrafts, for example are known:

The patent of Russia No 1808762, issue 15 Apr. 1993, bul. No 14;

The patent of the USSR No 1828444, cl. B 64 B 1/00 issue 15 Jul. 1993, bul. No 26;

The patent of Russia No 2009073, cl. B 64 B 1/00, issue 15 Mar. 1994, bul. No 5;

The patent of Russia No 2093414, cl. B 64 B 1/00, issue 20 Oct. 1997, bul. No 29;

The U.S. Pat. No. 5,595,358 from 21 Jan. 1997, cl. B 64 C 27/08;

The U.S. Pat. No. 5,909,857 from 8 Jun. 1999, cl. B64C 29/00 (20060101); B60V 3/00 (20060101); B60V 3/08 (20060101); B64B 001/02. (Classification of the USA 244/29; 180/127; 244/100A; 244/12.3; 244/23R);

The Euro patent No EP 0861773 A1 from 7 Oct. 1996, Cl. B64B 1/12, B64B 1/68;

The patent of Russia No 2092381, cl. 6 B64B1/12, B60V1/16, issue 10 Oct. 1997. <<The hybrid airship of A. I. Filimonov design>>;

As a prototype the patent of Russia No 2092381, cl. B64B1/12, B60V1/16 <<The hybrid airship of A. I. Filimonov design>> is chosen, issue 10 Oct. 1997.

The hybrid airship on a prototype, contains disk-shaped case with the central tunnel in which it is mounted aerodynamic body with the lifting screw on its top part, fastened to tunnel walls radial partitions of an aerodynamic profile, pilot-passenger and cargo cabins, a power-plant with pushing screws, landing equipment on an air bearing in the form of inflatable toroidal cylinder and the wheel-ski supports mounted on an input in the central tunnel, controls and the stabilization mounted on an exit from the central tunnel, wing consoles and empennage with the fin and two and more keels, mounted on a case back part, the jet flaps mounted on the back edges of wing consoles and the case, the jets elevators mounted on the fin and on the wing consoles, differing that it is in addition supplied by ailerons, mounted on the fin, and a flexible protection, mounted on a forward part from below of toroidal cylinder.

It is in addition supplied by equipment for launch from water in a kind of gliding surface under a cabin which are executed in a kind of gliding surface and are located under a pilot-passenger cabin and a hydrofoil behind the case, and the flexible protection is as a skirt type cone thus a skirt of a flexible protection is executed from a dense fabric.

The appointed aircrafts as lifting force for cargoes transportation use aerodynamic elements (wings, case surfaces), envelopes with lifting gas (helium, hydrogen, hot air), force of tractive power-plants (screws).

SUMMARY OF THE INVENTION

The technical decision on a prototype cannot be used for carrying out of wrecking, including is not adapted for mooring for objects at height and people evacuation from the top floors of buildings, and also is not adapted for landing to rough platforms, to water and launches from them.

Task of the present invention is creation of the aircrafts, providing necessary aircraft performance characteristics and thus to carry out for wrecking: fast ascent and high speed, possibilities of operated hovering in air and moorings (coupling) to objects at height, possibilities of landing to rough platforms, on water and launches from them.

This task decides because the survival aircraft is executed in the form of a design heavier than air, containing the rigid case for example, a fuselage, lifting surfaces (for example, wings), controls in the form of the fin, engines and propulsion devices inside rotation bodies of toroidal form, having in longitudinal section the aerodynamic profile, draft force turned from a vertical direction on horizontal, bearing devices, for example, retractable chassis. Thus in the top part of the case there are envelopes with lifting gas which lifting force counterbalances dry weight of the aircraft with formation increased metacentric aircraft heights. Inside the case, in the bottom part there is one pass through with exit hatchways and devices for mooring (coupling) to the external objects, equipped with a boarding bridge with hand-rail and the removable bogie for loading-unloading on the height of people and cargoes.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
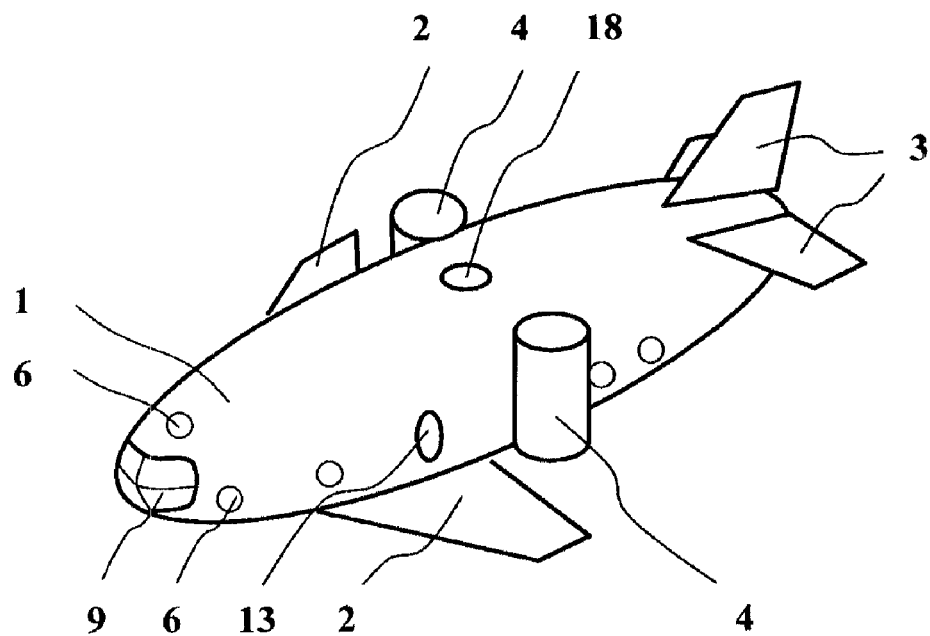
FIG. 1.—General view of survival aircraft.
Figure 4:
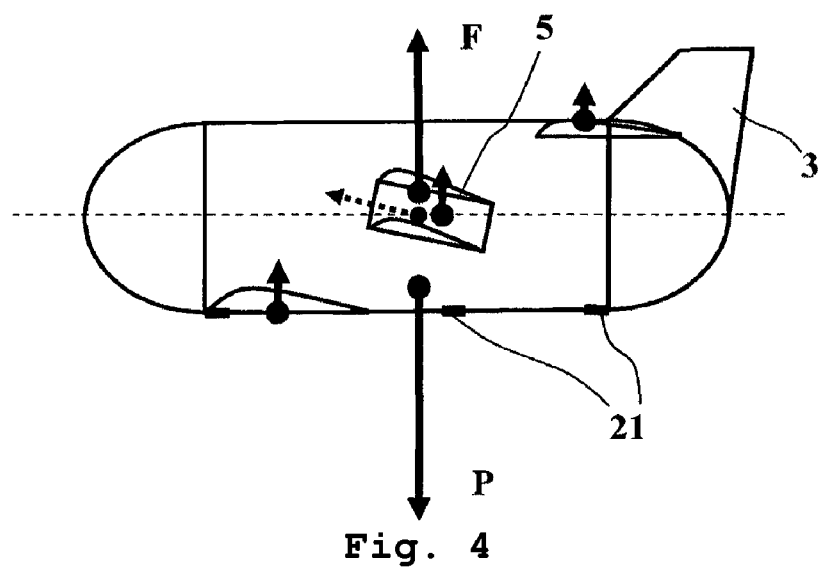
FIG. 4.—Vectors of operating forces on a longitudinal section.
Figure 8:
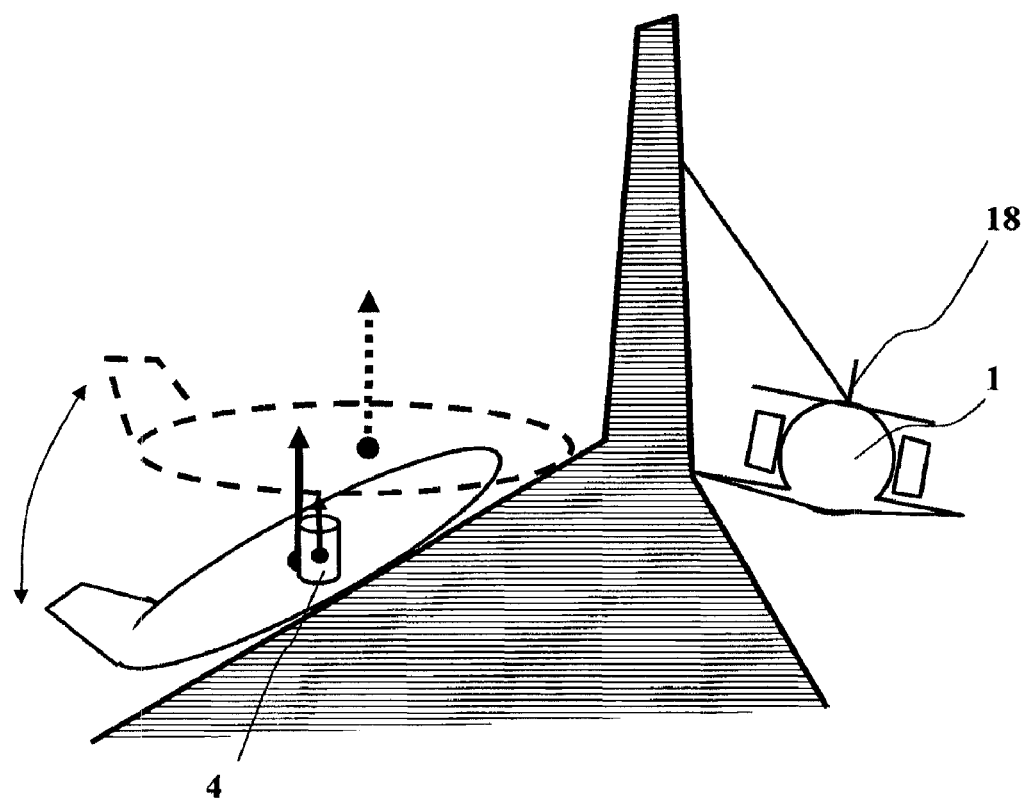
FIG. 8.—An example of mooring of survival aircraft to precipices.
Figure 9:
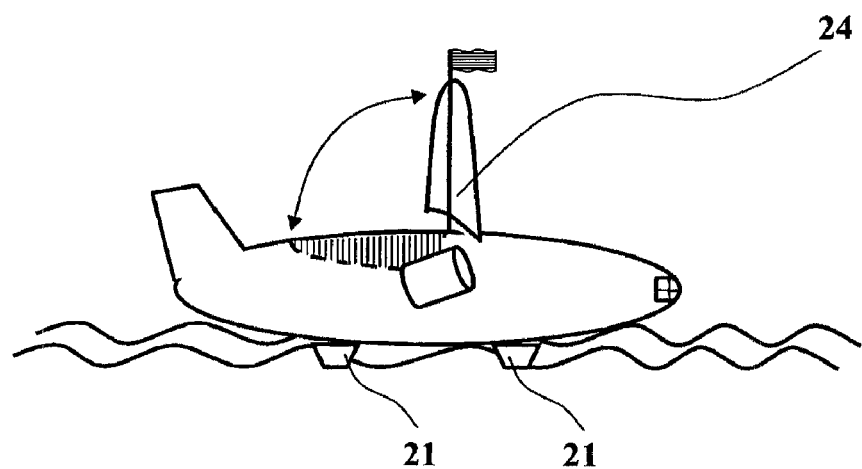
FIG. 9.—An example of safe landing to water

The survival aircraft (FIG. 1,) consists of the case, for example, a fuselage 1, lifting surfaces, for example, the wings 2 located in the same plane with the bottom part of a fuselage, 1 fin 3, the aerodynamic modules 4 containing engines and propulsion devices, (on FIGS. are not shown). Configuration of aerodynamic modules 4 is as toroidal rotation bodies which cross-section section in a plane which are passing through their rotation axis has an aerodynamic profile 5. Aerodynamic modules 4 can turn from a vertical direction of draft force on the horizontal. (FIG. 4). The device contains maneuverable propulsion devices 6. The main fuselage volume is occupied with envelopes 7 (FIGS. 1, 2), filled with lifting gas (helium). On the hole length of the bottom fuselage part there is a pass through 8 (FIG. 2) having a function of force beam, also it is the additional bearing device executed in the form of lifting designs. Pass through connects the crew cabin 9 located in a nose fuselage part 1, compartment for cargo and the passengers 10, located in the central fuselage part 1, fuel tanks 11 and the units 12 located in a tail fuselage part 1. Such arrangement provides is minimum low centre of gravity and necessary centering of aircraft at various loading (FIGS. 4, 5), and during of fuel output—displacement of the centre of gravity towards the nose part, promoting aircraft landing. Longitudinal pass through 8 is cut by cross pass 13 for an exit on a wings plane 2, and the vertical pass 14 equipped the winch 15 and devices for descent-lifting of people and cargoes 16 (FIG. 2,) through the bottom hatchway 17 and aircraft descent-lifting to a cable through the top hatchway 18 (FIG. 8). The aircraft has retractable chassis 19 intended for movement on a runway, for damping at landing, and plane elements 20 used for stabilization and movement control on water (FIG. 9) located on chassis 19, and also plane elastic snow support 21 located on the bottom fuselage part 1 and protecting aircraft from covering deformation at landing on rough platform.

Figure 5:
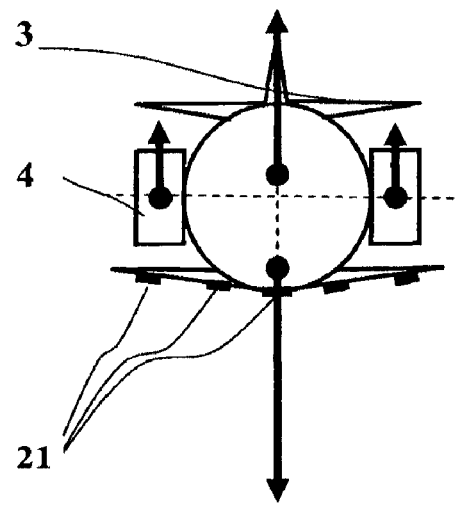
FIG. 5.—Vectors of operating forces on a cross-section.

Unlike designs of a prototype and analogues in which lifting force of envelopes with lifting gas is equal or makes 90% and more of maximum take-off weight of aircraft, in an offered design lifting force of envelopes with lifting gas does not exceed dry weight of aircraft (without crew, the fuel, payload) and makes about half of the maximum take-off weight. Other half of the maximum take-off weight is counterbalanced at vertical launch and hovering in air by engines draft and propulsion devices in aerodynamic modules 4, and at horizontal flight—lifting force of wings 2, the fin 3 and lifting force of aerodynamic modules with engines and propulsion devices 4 (FIGS. 4, 5).

INDUSTRIAL APPLICATION

Offered parities of mass, weight and draft of propulsion devices of aircraft provide necessary and sufficient aircraft performance characteristics for wrecking First, survival aircraft it is always heavier than air and for its flight pumping or heating of lifting gas that provides the maximum readiness for launch is not required. Secondly, ascent of survival aircraft to 1500 m and acceleration to 300 km/hour and more can occur for 20-30 seconds that provides high enough speeds. Thirdly, owing to dry weight of survival aircraft is constant balancing by envelopes with lifting gas, specific pressure upon the bottom planes (the fuselage 1, wings 2) turns out low. It allows survival aircraft at light payload and engines deenergizing in flight to soar in ascending streams of air long enough time that provides possibilities of long monitoring of transport highways and territories. At the maximum payload and engines deenergizing in flight survival aircraft can control descent with landing through tens kilometers that raises safety of flights. Fourthly, gravity centre of survival aircraft is in the bottom part of a fuselage, and the centre of lifting force is above on the removal equal approximately to radius of a fuselage that provides constantly operating increased metacentric height (FIG. 3) thanks to which survival aircraft after any deviation in air from horizontal position automatically comes back in horizontal, that excludes possibility of a vertical spin and provides safety of flight at high turbulence of air streams.

Use of aerodynamic modules of the toroidal form allows to reduce dimensions of survival aircraft at the expense of smaller wingspan and to provide, at the expense of propulsion devices location in aerodynamic modules and absence of open screws, safety of casual or compelled contact survival aircraft in flight to other objects. It allows to carry out safe flights in mountain district and in settlements among high-rise constructions and the tense wires.

Figure 6:
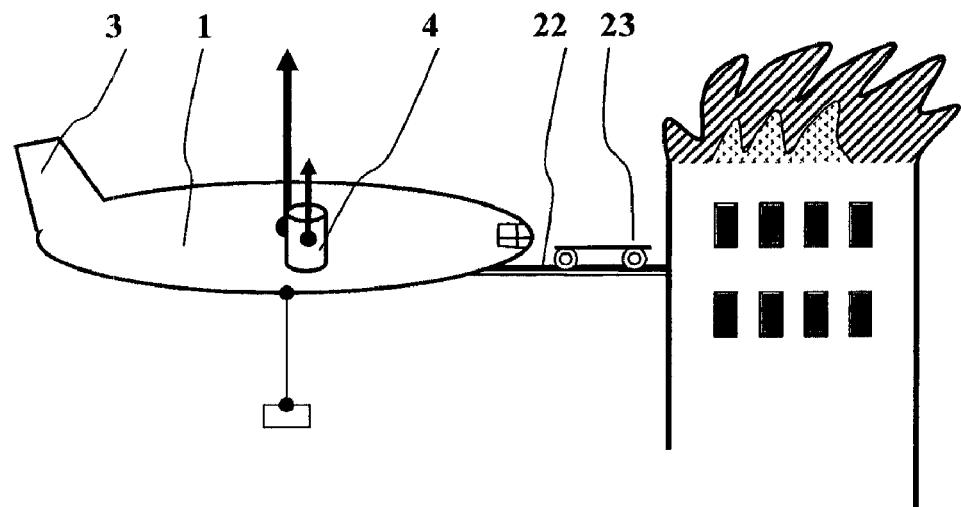
FIG. 6.—An example of mooring of survival aircraft to high-rise buildings.

Survival aircraft design is intended for hovering in air at vertical draught of propulsion devices, and also for mooring to vertical objects. For people rescue from the top floors of high-rise buildings the crew can slowly approach survival aircraft a nose to a window opening (on FIGS. it is not shown), to open the forward hatchway (on FIGS. it is not shown), a boarding bridge (FIG. 2,) to beat out a window frame by boarding beach (on FIGS. it is not shown) and to hook it for an window opening. For accuracy of movings and hit by a boarding bridge in window opening survival aircraft it is equipped, at least, by one maneuvering propulsion device 6, for example, mounted in a forward case part. After mooring to a wall rescuers and rescued can on a boarding bridge 22, for example, with hand-rail to pass from survival aircraft in a building and back. For evacuation of the injured people and moving of cargoes the removable bogie 23 (FIG. 6) is provided. Removable bogie has one degree of freedom for movement along a boarding bridge 22 and pass through 8.

Figure 2:
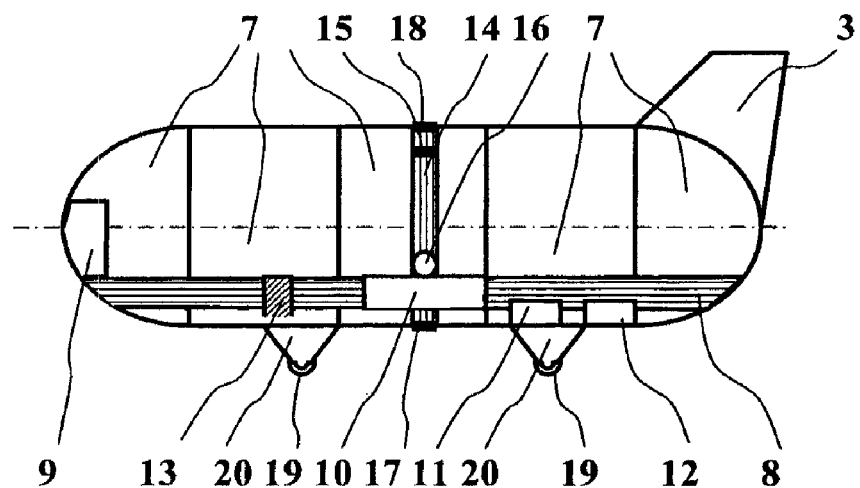
FIG. 2.—Longitudinal section of survival aircraft.

In a case when after evacuation from a building of people and cargoes weight of survival aircraft will not exceed maximum take-off weight, the crew unhooks a boarding bridge 22 from an window opening, put off it, takes away survival aircraft from a wall, closes the hatchway and delivers people by air to medical institution territory. In a case when at evacuation from a building of people and cargoes weight of survival aircraft can exceed maximum take-off weight, people arriving aboard and cargoes can go down on the earth or other safe place through the vertical pass 14 equipped the winch 15 and devices for descent-lifting of people and cargoes 16 (FIG. 2).

Through the top hatchway 18 of vertical passes 14 the survival aircraft can be suspended on a cable for a support points located upper. It can be used for long holding of survival aircraft on vertical walls or precipices, or for descent-lifting of survival aircraft in narrow gorges or among buildings and constructions (FIG. 8.).

Figure 3:
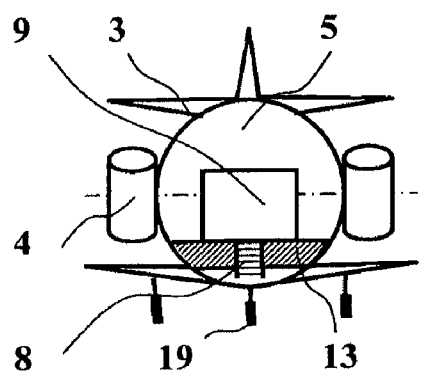
FIG. 3.—Cross-section on A-A of survival aircraft (FIG. 2).
Figure 7:
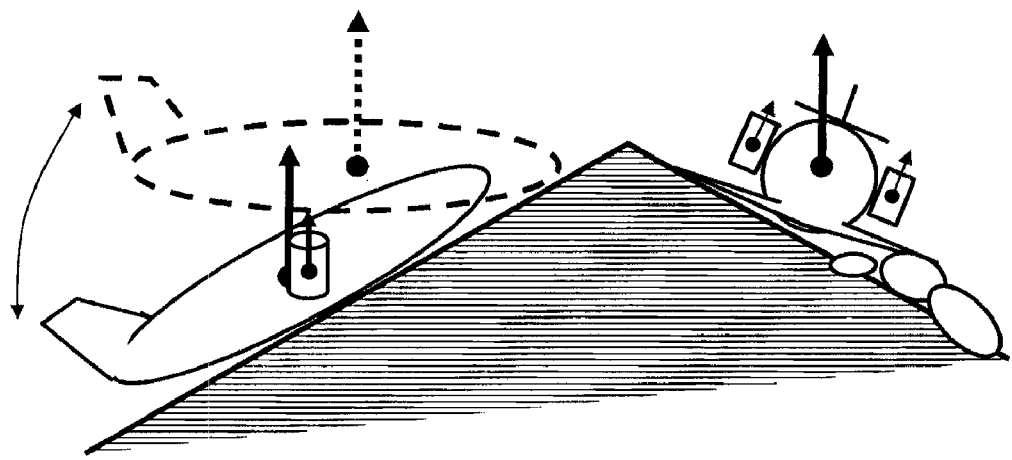
FIG. 7.—An example of safe landing to rough platforms and on water.

The constant equilibration of dry weight and action of increased metacentric heights allows survival aircraft at a finding on an inclined platform after inclusion of vertical draught of propulsion devices partially to come off a platform, to accept horizontal position and then to lunch, and also in horizontal position to touch inclined platforms and at smooth decrease in vertical draught of propulsion devices to land on them (FIG. 3). Design features allow survival aircraft to landing by a fuselage 1 and wings 2 as the additional bearing device on bogs, a scattering of stones, friable snow, thin ice, dense thickets, and then to fly up from them that provides possibilities of landing practically in any place or nearby (FIG. 7).

Design of survival aircraft allows to land on water and to keep on its surface vaguely long time, as fuselage volume (envelopes with lifting gas) in hundreds times more volume of superseded water. Cross-section stability on water is provided with the tight hollow wings which are carrying out the function of lateral stabilizing floats. The guarantee of buoyancy and additional durability of survival aircraft design is provided with that in the bottom fuselage part and wings there are the cavities filled rigid floating material (polyfoam).

At the equipment of aircraft devices of draw off and water dump, it can be used for suppression of fires. Thus the parity of weight of taken away water to draught of propulsion devices turns out greatest possible.

In floating position survival aircraft can accept people and cargoes from high objects (precipices, a deck of the ships) through the top hatchway; directly from water—in nose and tail hatchways; it is easy to drag people and cargoes from water on wings 2 and then in lateral hatchways of cross-section passes that increases possibilities and rescue guarantees. In a case when on water weight of survival aircraft after reception of people and cargo becomes more maximum take-off, it can move over water as a vehicle on an air cushion or on a water surface as a speedboat. Operated movement of survival aircraft on water at the switched off engines (malfunction, absence or economy of fuel) is provided with a folding mast on the hinge with a rigid curvilinear sail 24 which in the lowered condition is an element of the top fuselage part 1, and function of two keels and a elevator carry out the planes which are elements of rigidity of retractable chassis 19.

While this invention has been particularly shown and described with references to preferred embodiments thereof, it will be understood by those skilled in the art that various changes in form and details may be made therein without departing from the scope of the invention encompassed by the appended claims.

What is claimed is:

1. A rescue aircraft, comprising:
   a fuselage comprising
      a fuselage cabin and envelopes filled with a lift gas, the envelopes being disposed within the fuselage;
   lifting surfaces;
   controls;
   a propulsion system comprising propulsion devices; and
   support devices;
   wherein the propulsion devices are located inside toroidal units having an aerodynamic longitudinal cross-section;
   wherein the toroidal units are rotatable to alternate between a vertical direction of a propulsion system's thrust force and a horizontal direction of the thrust force; and
   wherein the fuselage further comprises a through passage within a lower part of the fuselage, the passage comprising hatches and at least one mooring device.

2. The rescue aircraft according to claim 1, wherein one of the support devices comprises:
   bearing structures of the passage,
      wherein the bearing structures form a load-bearing beam;
   bottom surfaces of the fuselage; and
   lower portions of the lifting surfaces;
   wherein the lifting surfaces comprise closed cavities filled with solid buoyant material for buoyancy and stability of the rescue aircraft on water and on land.

3. The rescue aircraft according to claim 1, wherein the passage further comprises at least one pull-out gangway and a removable cart, the removable cart having a single degree of freedom for movement along the pull-out gangway and the passage.

4. The rescue aircraft according to claim 1, further comprising at least one maneuvering propulsion device for precise movement of the aircraft during flights in a confined space, for mooring to external objects at a height, and for construction tasks.

5. The rescue aircraft of claim 1, wherein the aircraft with the envelopes filled to capacity with the lift gas and without people, cargo, or fuel on board is heavier than air displaced by the aircraft.

6. The rescue aircraft of claim 5, wherein combined aerodynamic effects of the lifting surfaces, propulsion devices, and rotatable toroidal units are sufficient to keep the aircraft aloft and to propel the aircraft.

7. A rescue aircraft comprising:
   a fuselage comprising
      a fuselage cabin and envelopes filled with a lift gas, the envelopes being disposed within the fuselage;
   lifting surfaces;
   controls;
   a propulsion system comprising propulsion devices; and
   support devices;
   wherein the propulsion devices are located inside toroidal units having an aerodynamic longitudinal cross-section;
   wherein the toroidal units are rotatable to alternate between a vertical direction of a propulsion system's thrust force and a horizontal direction of the thrust force; and
   wherein the fuselage further comprises a through passage within a lower part of the fuselage, the passage comprising hatches and at least one mooring device;
   the rescue aircraft further comprising;
   a bottom hatch,
   a top hatch,
   a vertical passage between the bottom hatch and the top hatch;
   a pulley with a drive,
   devices for lowering and raising people and cargo through the bottom hatch, and
   devices for lowering and lifting of the aircraft by a cable running through the top hatch.

8. A rescue aircraft comprising:
   a fuselage comprising
      a fuselage cabin and envelopes filled with a lift gas, the envelopes being disposed within the fuselage;
   lifting surfaces;
   controls;
   a propulsion system comprising propulsion devices; and
   support devices;
   wherein the propulsion devices are located inside toroidal units having an aerodynamic longitudinal cross-section;
   wherein the toroidal units are rotatable to alternate between a vertical direction of a propulsion system's thrust force and a horizontal direction of the thrust force; and
   wherein the fuselage further comprises a through passage within a lower part of the fuselage, the passage comprising hatches and at least one mooring device;
   the rescue aircraft further comprising:
   a foldable rigid curvilinear sail functioning as a surface element of a top portion of the fuselage upon folding; and
   a landing gear comprising two keels and a rudder.

9. A rescue aircraft comprising:
a fuselage comprising
   a fuselage cabin and envelopes filled with a lift gas,
      the envelopes being disposed within the fuselage;
lifting surfaces;
controls;
a propulsion system comprising propulsion devices; and
support devices;
wherein the propulsion devices are located inside toroidal units having an aerodynamic longitudinal cross-section;
wherein the toroidal units are rotatable to alternate between a vertical direction of a propulsion system's thrust force and a horizontal direction of the thrust force;
wherein the fuselage further comprises a through passage within a lower part of the fuselage, the passage comprising hatches and at least one mooring device;
wherein one of the support devices comprises:
   bearing structures of the passage,
      wherein the bearing structures form a load-bearing beam;
   bottom surfaces of the fuselage; and
   lower portions of the lifting surfaces; and
wherein the lifting surfaces comprise closed cavities filled with solid buoyant material for buoyancy and stability of the rescue aircraft on water and on land;
the rescue aircraft further comprising:
a foldable rigid curvilinear sail functioning as a surface element of a top portion of the fuselage upon folding; and
a landing gear comprising two keels and a rudder.

* * * * *